(12) United States Patent
Karabinis

(10) Patent No.: US 7,558,568 B2
(45) Date of Patent: Jul. 7, 2009

(54) SYSTEMS AND METHODS FOR MODIFYING ANTENNA RADIATION PATTERNS OF PERIPHERAL BASE STATIONS OF A TERRESTRIAL NETWORK TO ALLOW REDUCED INTERFERENCE

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 871 days.

(21) Appl. No.: 10/880,023

(22) Filed: Jun. 28, 2004

(65) Prior Publication Data

US 2005/0026606 A1    Feb. 3, 2005

Related U.S. Application Data

(60) Provisional application No. 60/490,638, filed on Jul. 28, 2003, provisional application No. 60/492,710, filed on Aug. 5, 2003.

(51) Int. Cl.
*H04W 4/00* (2009.01)
(52) U.S. Cl. ................ 455/427; 455/12.1; 455/448
(58) Field of Classification Search ............ 455/3.01, 455/11.1, 12.1, 13.1, 13.2, 13.3, 63.4, 101, 455/403, 422.1, 427, 430, 443, 444, 447, 455/448
See application file for complete search history.

(56) References Cited

U.S. PATENT DOCUMENTS

| 4,144,496 A | * | 3/1979 | Cunningham et al. ....... 455/447 |
| 4,901,307 A | | 2/1990 | Gilhousen et al. |
| 5,073,900 A | | 12/1991 | Mallinckrodt |
| 5,303,286 A | | 4/1994 | Wiedeman |
| 5,307,507 A | * | 4/1994 | Kanai ........................ 455/447 |
| 5,339,330 A | | 8/1994 | Mallinckrodt |
| 5,392,450 A | * | 2/1995 | Nossen ...................... 455/12.1 |
| 5,394,561 A | | 2/1995 | Freeburg |
| 5,446,756 A | | 8/1995 | Mallinckrodt |
| 5,448,623 A | | 9/1995 | Wiedeman et al. |

(Continued)

FOREIGN PATENT DOCUMENTS

| EP | 0 506 255 A2 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Patrick N. Edouard
*Assistant Examiner*—Anthony S Addy
(74) *Attorney, Agent, or Firm*—Myers Bigel Sibley & Sajovec, P.A.

(57) ABSTRACT

A wireless communications system may include a terrestrial network including a plurality of base stations providing communications service for radioterminals over a terrestrial network coverage area. The plurality of base stations may include interior base stations providing communications service for radioterminals in an interior portion of the terrestrial network coverage area and peripheral base stations providing communications service for radioterminals at a peripheral portion of the terrestrial network coverage area. At least one of the peripheral base stations provides transmissions directed toward an interior portion of the terrestrial network coverage area with greater power than transmissions directed away from interior portions of the terrestrial network coverage area. Related methods are also discussed.

18 Claims, 6 Drawing Sheets

U.S. PATENT DOCUMENTS

| | | |
|---|---|---|
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,122,266 A * | 9/2000 | Lynch ........................ 370/335 |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,611 B1 | 1/2002 | Antonio et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,879,845 B2 * | 4/2005 | Suzuki et al. ............ 455/562.1 |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 2002/0041575 A1 | 4/2002 | Karabinis |
| 2002/0090942 A1 | 7/2002 | Karabinis |
| 2002/0122408 A1 | 9/2002 | Mullins |
| 2002/0146979 A1 | 10/2002 | Regulinski et al. |
| 2002/0160708 A1 | 10/2002 | Hane et al. |
| 2002/0168973 A1 | 11/2002 | Dent et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054760 A1 | 3/2003 | Karabinis |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0143949 A1 | 7/2003 | Karabinis |
| 2003/0149986 A1 | 8/2003 | Mayfield et al. |
| 2003/0153267 A1 | 8/2003 | Karabinis |
| 2003/0153308 A1 | 8/2003 | Karabinis |
| 2003/0224785 A1 | 12/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0131125 A1 * | 7/2004 | Sanderford et al. ......... 375/261 |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040659 A1 | 2/2006 | Karabinis |

FOREIGN PATENT DOCUMENTS

| | | |
|---|---|---|
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

International Search Report and Written Opinion for International Application No. PCT/US04/22422, mailed Jun. 16, 2008 (10 pages).

* cited by examiner

SYSTEMS AND METHODS FOR MODIFYING ANTENNA RADIATION PATTERNS OF PERIPHERAL BASE STATIONS OF A TERRESTRIAL NETWORK TO ALLOW REDUCED INTERFERENCE

RELATED APPLICATIONS

This application claims the benefit of: provisional Application No. 60/490,638, filed Jul. 28, 2003, entitled Systems and Methods for Modifying Antenna Radiation Patterns of Peripheral Base Stations of an Ancillary Terrestrial Component to Allow Reduced Interference; and of provisional Application No. 60/492,710, filed Aug. 5, 2003, entitled Additional Systems And Methods For Modifying Antenna Radiation Patterns Of Peripheral Base Stations Of An Ancillary Terrestrial Component To Allow Reduced Interference. Both of the above referenced provisional patent applications are assigned to the assignee of the present application, and the disclosures of both of the above referenced provisional patent applications are hereby incorporated herein by reference in their entirety as if set forth fully herein.

FIELD OF THE INVENTION

This invention relates to wireless communications systems and methods, and more particularly to terrestrial cellular communications systems and methods.

BACKGROUND

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet and/or intranet access, Web browser, organizer, calendar and/or a global positioning system (GPS) receiver; and/or conventional laptop and/or palmtop computers or other appliances, which include a radio frequency transceiver. Radiotelephones may also be referred to herein as "radioterminals" or simply "terminals".

As is well known to those having skill in the art, terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite band spectrum may be underutilized or unutilized in such areas. The use of terrestrial retransmission of all or some of the satellite band frequencies can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., in and/or proximate to densely populated urban, industrial, and/or commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band and/or dual mode alternatives, such as the well known Thuraya, Iridium and/or Globalstar dual mode satellite and/or terrestrial radiotelephone systems, may duplicate some components, which may lead to increased cost, size and/or weight of the radiotelephone.

U.S. Pat. No. 6,684,057 issued Jan. 27, 2004, to the present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite radiotelephone frequency can be reused terrestrially by an ancillary terrestrial network even within the same satellite cell, using interference cancellation techniques. In particular, the satellite radiotelephone system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

United States Patent Application Publication No. 2003/0054761 A1, published Mar. 20, 2003 to the present inventor Karabinis and entitled Spatial Guardbands for Terrestrial Reuse of Satellite Frequencies, the disclosure of which is hereby incorporated herein by reference in its entirety as if set forth fully herein, describes satellite radiotelephone systems that include a space-based component that is configured to provide wireless radiotelephone communications in a satellite footprint over a satellite radiotelephone frequency band. The satellite footprint is divided into a plurality of satellite cells, in which satellite radiotelephone frequencies of the satellite radiotelephone frequency band are spatially reused. An ancillary terrestrial network is configured to terrestrially reuse at least one of the ancillary radiotelephone frequencies that is used in a satellite cell in the satellite footprint, outside the cell and in some embodiments separated therefrom by a spatial guardband. The spatial guardband may be sufficiently large to reduce or prevent interference between the at least one of the satellite radiotelephone frequencies that is used in the satellite cell in the satellite footprint, and the at least one of the satellite radiotelephone frequencies that is terrestrially reused outside the satellite cell and separated therefrom by the spatial guardband. The spatial guardband may be about half a radius of a satellite cell in width.

United States Patent Application Publication No. US 2003/0054815 A1, published Mar. 20, 2003 to the present inventor Karabinis, and entitled Methods and Systems for Modifying Satellite Antenna Cell Patterns in Response to Terrestrial Reuse of Satellite Frequencies, the disclosure of which is hereby incorporated herein by reference in its entirety as if set forth fully herein, describes that space-based wireless radiotelephone communications are provided in a satellite footprint over a satellite radiotelephone frequency band. The satellite footprint is divided into satellite cells in which satellite radiotelephone frequencies of the satellite radiotelephone frequency band are spatially reused. At least one of the satellite radiotelephone frequencies that is assigned to a given satellite cell in the satellite footprint is terrestrially reused outside the given satellite cell. A radiation pattern of at least the given satellite cell is modified to reduce interference with the at least one of the satellite radiotelephone frequencies that is terrestrially reused outside the given satellite cell.

SUMMARY

According to embodiments of the present invention, a communications system may include a terrestrial network having a plurality of base stations providing communications service for radioterminals over a terrestrial network coverage area. The plurality of base stations may include interior base stations providing communications service for radioterminals in an interior portion of the terrestrial network coverage area and peripheral base stations providing communications service for radioterminals at a peripheral portion of the terrestrial network coverage area. Moreover, at least one of the peripheral base stations may provide transmissions directed toward an interior portion of the terrestrial network coverage area with greater power than transmissions directed away from interior portions of the terrestrial network coverage area.

The peripheral base stations and/or interior base stations may define a portion of a perimeter of the terrestrial network coverage area such that interior base stations of the terrestrial network are located on one side of the perimeter and not on the other side of the perimeter. In addition, the perimeter may be closed surrounding interior portions of the terrestrial network coverage area. Moreover, at least one of the interior base stations may define a plurality of sectors surrounding the interior base station(s), and transmissions may be directed from the interior base station(s) to each of the sectors so that transmissions are directed over a 360 degree pattern surrounding the interior base station.

At least one peripheral base stations may define a plurality of sectors surrounding the peripheral base station(s), and the peripheral base station(s) may provide transmissions to at least one sector directed substantially toward an interior portion of the terrestrial network coverage area with greater power than toward another sector directed substantially away from interior portions of the terrestrial network coverage area. At least one peripheral base station(s) may include directional transmission antenna(s) for sector(s) directed substantially toward interior portions of the terrestrial network coverage area but not for the sector(s) directed substantially away from interior portions of the terrestrial network coverage area. In addition, at least one peripheral base station(s) may include directional receive antenna(s) directed to at least one of the sectors surrounding the peripheral base station(s). Moreover, at least one peripheral base station(s) may have fewer transmit sectors, fewer transmit antenna elements, different transmit antenna elements, and/or different transmit gain patterns than at least one interior base station.

The communications system may also include a second terrestrial network having a second plurality of base stations providing communications service for radioterminals over a second terrestrial network coverage area, and a no-service region may separate the first and second terrestrial network coverage areas. Accordingly, communications services may not be provided by base stations of either of the first or the second terrestrial networks in the no-service region.

In addition, the communications system may include a space based network including at least one satellite. The space based network may provide communications service for radioterminals in a first satellite coverage area using at least a first frequency of a satellite frequency band, and the space based network may provide communications service for radioterminals in a second satellite coverage area using at least a second frequency of the satellite frequency band. Moreover, at least a portion of the terrestrial network coverage area may be within the first satellite coverage area, and an entirety of the terrestrial network coverage area may be outside the second satellite coverage area. In addition, at least one of the base stations of the terrestrial network may provide communications service using the second frequency of the satellite frequency band, and at least one of the base stations may not provide communications to and/or from the radioterminals receiving communications from the base stations, using the first frequency of the satellite frequency band.

The space based network may transmit communications to radioterminals in the first satellite coverage area using the first frequency, and the space based network may transmit communications to radioterminals in the second satellite coverage area using the second frequency. Moreover, the at least one of the base stations of the terrestrial network may transmit communications using the second frequency. In addition, the space based network may receive communications from radioterminals in the first satellite coverage area using at least a third frequency. The space based network may receive communications from radioterminals in the second satellite coverage area using at least a fourth frequency, at least one of the base stations of the terrestrial network may receive communications using the fourth frequency, and at least one of the base stations of the terrestrial network may not receive communications from the radio terminals receiving communications from the base stations of the terrestrial network, using the third frequency.

The terrestrial network may also include a plurality of receive-only base stations configured to receive communications from radioterminals at the peripheral portion of the terrestrial network coverage area. Accordingly, communications service for a radioterminal may be provided by a receive-only base station receiving communications from the radioterminal and by another base station transmitting communications to the radioterminal.

According to additional embodiments of the present invention, a communications system may include a terrestrial network having a plurality of base stations providing communications service for radioterminals over a terrestrial network coverage area. The plurality of base stations may include interior base stations providing communications service for radioterminals in an interior portion of the terrestrial network coverage area and peripheral base stations providing communications service for radioterminals at a peripheral portion of the terrestrial network coverage area. Moreover, at least one of the peripheral base stations may be a receive-only base station that does not transmit.

The peripheral base stations and/or interior base stations may define a portion of a perimeter of the terrestrial network coverage area such that interior base stations of the terrestrial network are located on one side of the perimeter and not on the other side of the perimeter. In addition, the perimeter may be closed surrounding interior portions of the terrestrial network coverage area. Moreover, at least one interior base station(s) may define a plurality of sectors surrounding the interior base station(s), and transmissions may be directed from at least one interior base station(s) to each of the sectors so that transmissions are directed over a 360 degree pattern surrounding at least one interior base station(s). At least one peripheral base station(s) may define a plurality of sectors surrounding the peripheral base station(s), and at least one peripheral base station(s) may include directional reception antenna(s) for at least one of the sectors.

The communications system may also include a second terrestrial network having a second plurality of base stations providing communications service for radioterminals over a second terrestrial network coverage area. Moreover, a no-service region may separate the first and second terrestrial network coverage areas such that communications services are not provided by base stations of either of the first or the second terrestrial networks in the no-service region.

In addition, the communications system may also include a space based network having at least one satellite. The space based network may provide communications service for radioterminals in a first satellite coverage area using at least a first frequency of a satellite frequency band, and the space based network may provide communications service for radioterminals in a second satellite coverage area using at least a second frequency of the satellite frequency band. Moreover, at least a portion of the terrestrial network coverage area may be within the first satellite coverage area, and an entirety of the terrestrial network coverage area may be outside the second satellite coverage area. In addition, at least one of the base stations may provide communications service using the second frequency of the satellite frequency band, and at least one of the base stations may not provide communications to and/or from the radioterminals receiving communications from the base stations, using the first frequency of the satellite frequency band.

The space based network may transmit communications to radioterminals in the first satellite coverage area using the first frequency, and the space based network may transmit communications to radioterminals in the second satellite coverage area using the second frequency. Moreover, the at least one of the base stations of the terrestrial network may transmit communications using the second frequency. The space based network may receive communications from radioterminals in the first satellite coverage area using at least a third frequency, and the space based network may receive communications from radioterminals in the second satellite coverage area using at least a fourth frequency. In addition, at least one of the base stations of the terrestrial network may receive communications using the fourth frequency, and at least one of the base stations of the terrestrial network may not receive communications, from the radio terminals receiving communications from the base stations, using the third frequency.

According to still additional embodiments of the present invention, a communications system may include a terrestrial network having a plurality of base stations providing communications service for radioterminals over a terrestrial network coverage area. The plurality of base stations may include interior base stations providing communications service for radioterminals in an interior portion of the terrestrial network coverage area and peripheral base stations providing communications service for radioterminals at a peripheral portion of the terrestrial network coverage area. In addition, at least one of the peripheral base stations may be substantially disabled for transmission away from interior portions of the terrestrial network coverage area.

The peripheral base stations and/or the interior base stations may define a portion of a perimeter of the terrestrial network coverage area such that interior base stations of the terrestrial network are located on one side of the perimeter and not on the other side of the perimeter. Moreover, the perimeter may be closed surrounding interior portions of the terrestrial network coverage area.

At least one of the peripheral base stations may have fewer transmit sectors, fewer transmit antenna elements, different transmit antenna elements, and/or different transmit gain patterns than at least one of the interior base stations. Moreover, at least one of the interior base stations may transmit and receive communications, and at least one of the peripheral base stations may be a receive-only peripheral base station. The communications system may also include a second terrestrial network having a second plurality of base stations providing communications service for radioterminals over a second terrestrial network coverage area. In addition, a no-service region may separate the first and second terrestrial network coverage areas such that communications services may not be provided by base stations of either of the first or the second terrestrial networks in the no-service region.

The communications system may also include a space based network having at least one satellite. The space based network may provide communications service for radioterminals in a first satellite coverage area using at least a first frequency of a satellite frequency band, and the space based network may provide communications service for radioterminals in a second satellite coverage area using at least a second frequency of the satellite frequency band. At least a portion of the terrestrial network coverage area may be within the first satellite coverage area, and an entirety of the terrestrial network coverage area may be outside the second satellite coverage area. Moreover, at least one of the base stations may provide communications service using the second frequency of the satellite frequency band, and at least one of the base stations may not provide communications to and/or from the radioterminals receiving communications from the base stations, using the first frequency of the satellite frequency band.

At least one of the peripheral base stations may provide transmissions directed toward an interior portion of the terrestrial network coverage area with greater power than transmissions directed away from interior portions of the terrestrial network coverage area. At least one of the peripheral base stations may be a receive-only base station that does not transmit.

According to yet additional embodiments of the present invention, methods of providing communications for radioterminals may include providing communications service for radioterminals at an interior portion of a terrestrial network coverage area using interior base stations. Communications service may be provided for radioterminals at a peripheral portion of the terrestrial network coverage area using peripheral base stations. More particularly, at least one of the peripheral base stations may provide transmissions directed toward an interior portion of the terrestrial network coverage area with greater power than transmissions directed away from interior portions of the terrestrial network coverage area.

According to more embodiments of the present invention, methods of providing communications for radioterminals may include providing communications service for radioterminals at an interior portion of a terrestrial network coverage area using a plurality of interior base stations. Communications service may be provided for radioterminals at a peripheral portion of the terrestrial network coverage area using a plurality of peripheral base stations wherein at least one of the peripheral base stations is a receive-only base station that does not transmit.

According to still more embodiments of the present invention, methods of providing communications for radioterminals may include providing communications for radioterminals at an interior portion of a terrestrial network coverage area using a plurality of interior base stations. Communications may be provided for radioterminals at a peripheral portion of the terrestrial network coverage area using a plurality of peripheral base stations wherein at least one of the peripheral base stations is substantially disabled for transmission away from interior portions of the terrestrial network coverage area.

According to yet more embodiments of the present invention, a communications system may include a plurality of interior down-link transmitters configured to transmit communications to radioterminals located in interior portions of a terrestrial network coverage area. A plurality of interior up-link receivers may be configured to receive communications from radioterminals located in the interior portions of the terrestrial network coverage area. In addition, a plurality of peripheral up-link receivers may be configured to receive communications from radioterminals located in a peripheral region of the terrestrial network coverage area adjacent the interior portions of the terrestrial network coverage area, wherein at least a portion of the peripheral region is outside an engineered coverage area of any down-link transmitters of the communications system.

Some embodiments of the present invention provide an Ancillary Terrestrial Component (ATC) that is configured to wirelessly communicate with a plurality of radioterminals using at least one satellite radiotelephone frequency over an ATC service area. The ATC includes a plurality of base stations that are configured to wirelessly communicate with the plurality of radioterminals using at least one satellite radiotelephone frequency. The plurality of base stations includes at least one interior base station that is located in an interior portion of the ATC service area, and at least one peripheral base station that is located at a periphery of the ATC service area. In some embodiments, at least one peripheral base station has fewer transmit sectors, fewer transmit antenna elements, different transmit antenna elements and/or different transmit gain patterns than at least one interior base station. In other embodiments, at least one interior base station is at least one transmit and receive interior base station, and the ATC further includes at least one receive-only peripheral base station. Thus, systems and methods are provided for modifying antenna radiation patterns of peripheral base stations of an ancillary terrestrial component, compared to interior base stations, to allow reduced interference.

DETAILED DESCRIPTION

Figure 1:
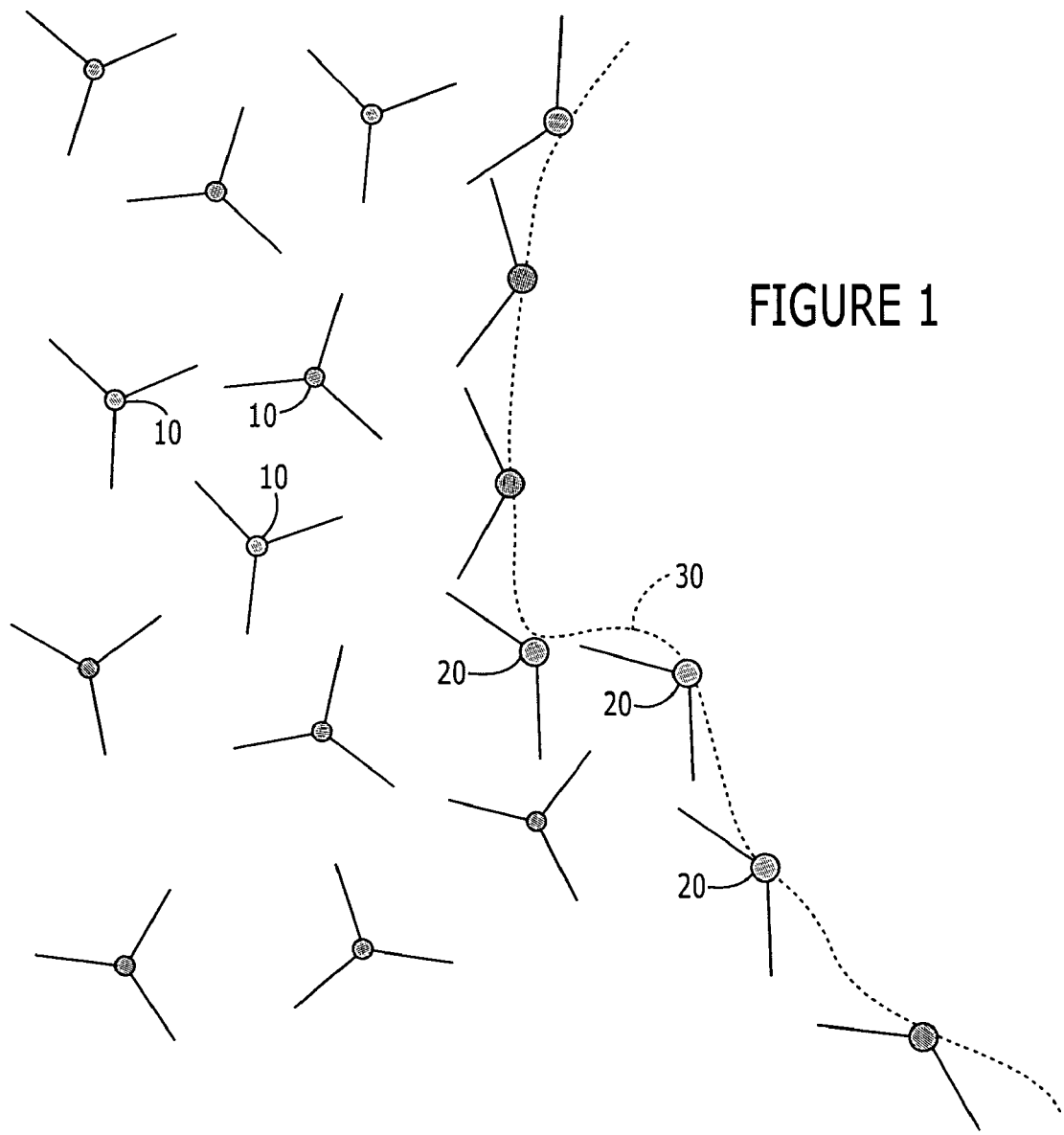
FIG. 1 is a diagram illustrating portions of a terrestrial network according to first embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first, second, etc. are used herein to describe various elements, these elements should not be limited by these terms. These terms are only used to distinguish one element or embodiment from another element or embodiment. Thus, a first element or embodiment below could be termed a second element or embodiment, and similarly, a second element or embodiment may be termed a first element or embodiment without departing from the teachings of the present invention. As used herein, the term "and/or" includes any and all combinations of one or more of the associated listed items. Moreover, as used herein, "substantially the same" band means that the bands substantially overlap, but that there may be some areas of non-overlap, for example at the band ends. Moreover, "substantially the same" air interface(s) means that the air interfaces are similar but need not be identical. Some changes may be made to one air interface (i.e., a satellite air interface) relative to another (i.e., a terrestrial air interface) to account for different characteristics that may exist between the terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used). In addition or in alternatives, different forward error correction coding, different interleaving depth, and/or different spread-spectrum codes may be used, for example, for satellite communications compared to the coding, interleaving depth, and/or spread spectrum codes (i.e., Walsh codes, long codes, and/or frequency hopping codes) that may be used for terrestrial communications.

Moreover, as used herein, a "substantially southern" or a "substantially northern" direction means a direction that includes a component in a southern or northern direction, respectively. For example, a southwestern direction may be a substantially southern direction.

Satellite systems that may operate co-frequency (also referred to as co-channel) with at least some frequencies of a satellite system containing an Ancillary Terrestrial Component (ATC) may receive co-frequency (co-channel) interference from the co-frequency (co-channel) operations of the ATC. To reduce the level of co-frequency (co-channel) interference that may be generated by an ATC, the ATC base stations may be engineered with X dB (e.g., 18 dB) of in-building penetration signal margin, such as, for example, X dB of in-building penetration return-link signal margin. This signal margin may enable an ATC radioterminal (i.e., a radioterminal that is communicating with an ATC) to operate even when it is subjected to X dB of structural signal attenuation and may also facilitate a reduction of the radioterminal's output signal power when the radioterminal is being subjected to less than X dB of structural signal attenuation. In the limit, as the radioterminal is not being subjected to any structural signal attenuation (the radioterminal is entirely in the clear) the signal power that the radioterminal may radiate in order to communicate with a base station may be reduced by as much as X dB (e.g., 18 dB) relative to maximum. This can reduce the level of interference that may be sensed by a co-frequency (co-channel) satellite system.

As used herein, the term Ancillary Terrestrial Component (ATC) may refer to one or more terrestrial base stations in a terrestrial network of base stations providing communications service for radioterminals over a terrestrial network coverage area (also referred to as an ATC service area). For example, the term Ancillary Terrestrial Component may refer to a single terrestrial base station, with a plurality of such terrestrial base stations providing service for radioterminals over a coverage area of a terrestrial network (referred to as an Ancillary Terrestrial Network (ATN)).

Cellular and PCS systems are routinely deployed in urban areas with significant in-building signal penetration margins, typically ranging between 15 to 20 dB. Engineering an ATC with X dB (e.g., 18 dB) of structural attenuation signal margin may be accomplished by using one of a plurality of established statistical design methodologies that are known to those skilled in the art. In accordance with an example of such a design methodology and as an initial step, the link budget of a base station, and corresponding radioterminal equipment, may be calculated and balanced, bi-directionally, by taking into account some or all relevant base station, radioterminal, and/or propagation environment parameters such as the maximum Effective Isotropic Radiated Power (EIRP) of the base station and radioterminal equipment, the propagation exponent factor appropriate for the ATC environment, signal attenuation due to multipath fading, receiver sensitivities of base station and radioterminal, base station and/or radioterminal antenna gain and diversity reception gain factor, etc., including a signal loss of X dB (e.g., 18 dB) due to structural attenuation. The bi-directionally balanced link budget can identify an estimate of the service radius of a base station. At this service radius a radioterminal may communicate with a base station, with certain probability of success, subject to the assumed link budget parameter values and propagation impairments including the effect of one or more signal attenuating structures that may, in the aggregate, impose X dB (e.g., 18 dB) of additional signal attenuation beyond that imposed by the propagation loss (as defined, for example, by the conventional Cost 231-Hata model) and multipath fading loss. It follows that when a radioterminal is not subject to any signal attenuating structures, it can, subject to closed-loop power control, radiate at a reduced signal power level that averages X dB (e.g., 18 dB) lower than its maximum.

An ATC service area may comprise an ensemble of ATC base stations that may be engineered and deployed based on the above design principles. In such an environment, as an active radioterminal migrates from one ATC base station service area to another, the system may continue to provide service to the radioterminal via the ATC base station that can nominally provide the highest signal quality and/or strength to that radioterminal. As such, a radioterminal that is transitioning from the service area of one ATC base station to another and is operating outside the influence of any signal attenuating structures may, on average, continue to radiate at a reduced signal power level of X dB (e.g., 18 dB) less than its maximum.

According to some embodiments of the present invention, in the proximity of a perimeter of an ATC service area, the ATC may be configured to reduce, completely avoid and/or substantially minimize serving radioterminals that may be beyond the engineered service area of a base station and may thus radiate a higher level of power. This may be accomplished, according to some embodiments, by configuring and/or orienting the antenna elements of a base station to substantially illuminate only certain directions that, according to a link budget, may satisfy the X dB (e.g., 18 dB) structural attenuation signal margin configuration design of an ATC. Thus, for example, at least one ATC base station proximate to a perimeter of an ATC service area may be configured with a reduced (fewer) number of sectors, reduced (fewer) antenna elements and/or different antenna elements, and may thus not be capable of providing service in at least one direction, to substantially the same radius as in another direction.

Thus, as shown in FIG. 1, an ATC includes a plurality of base stations that are configured to wirelessly communicate with a plurality of radioterminals using at least one satellite radiotelephone frequency. The plurality of base stations include at least one interior base station 10, that is located at an interior portion of the ATC service area, and at least one peripheral base station 20 that is located at a perimeter 30 of the ATC service area. As shown in FIG. 1, at least one peripheral base station 20 has fewer sectors, fewer antenna elements, different antenna elements and/or different gain patterns than at least one interior base station 10. For example, as shown in FIG. 1, at least some of the interior base stations 10 have complete 360° coverage using, for example, three sectors, whereas at least one of the peripheral base stations 20 have a reduced number of sectors, such as one or two sectors.

It will be understood by those having skill in the art that, although FIG. 1 depicts a single row of peripheral base stations 20 adjacent the perimeter 30 of the ATC service area, more than one row of peripheral base stations may be provided. It also will be understood that, in some embodiments, only a single sector may be provided for the perimeter base stations 20. In still other embodiments, a complete set of sectors, such as three sectors, may be provided, with reduced numbers of antenna elements, reduced antenna gain, and/or reduced EIRP in one or more of the sectors, compared to the interior base stations 10. Combinations of these embodiments also may be provided. Moreover, each peripheral base station need not include the same (reduced) number of sectors and/or antenna elements, and not all peripheral base stations 20 need include fewer sectors, fewer antenna elements, different antenna elements, and/or different (reduced) EIRP. In some embodiments, the perimeter base stations 20 may communicate with an interior base station 10. In other embodiments, the peripheral base stations 20 may communicate with an ATC infrastructure.

In still other embodiments of the present invention, in lieu of, or in combination with, the ATC configuration of FIG. 1, at least one receive-only base station may be provided proximate to a perimeter of an ATC footprint, that may have been engineered in accordance with a link budget inclusive of X dB (e.g., 18 dB) of structural signal attenuation, so as to maintain the emissions of a radioterminal substantially in accordance with a reduced power level criterion as the radioterminal continues to operate outside of the engineered service footprint of the ATC.

Figure 2:
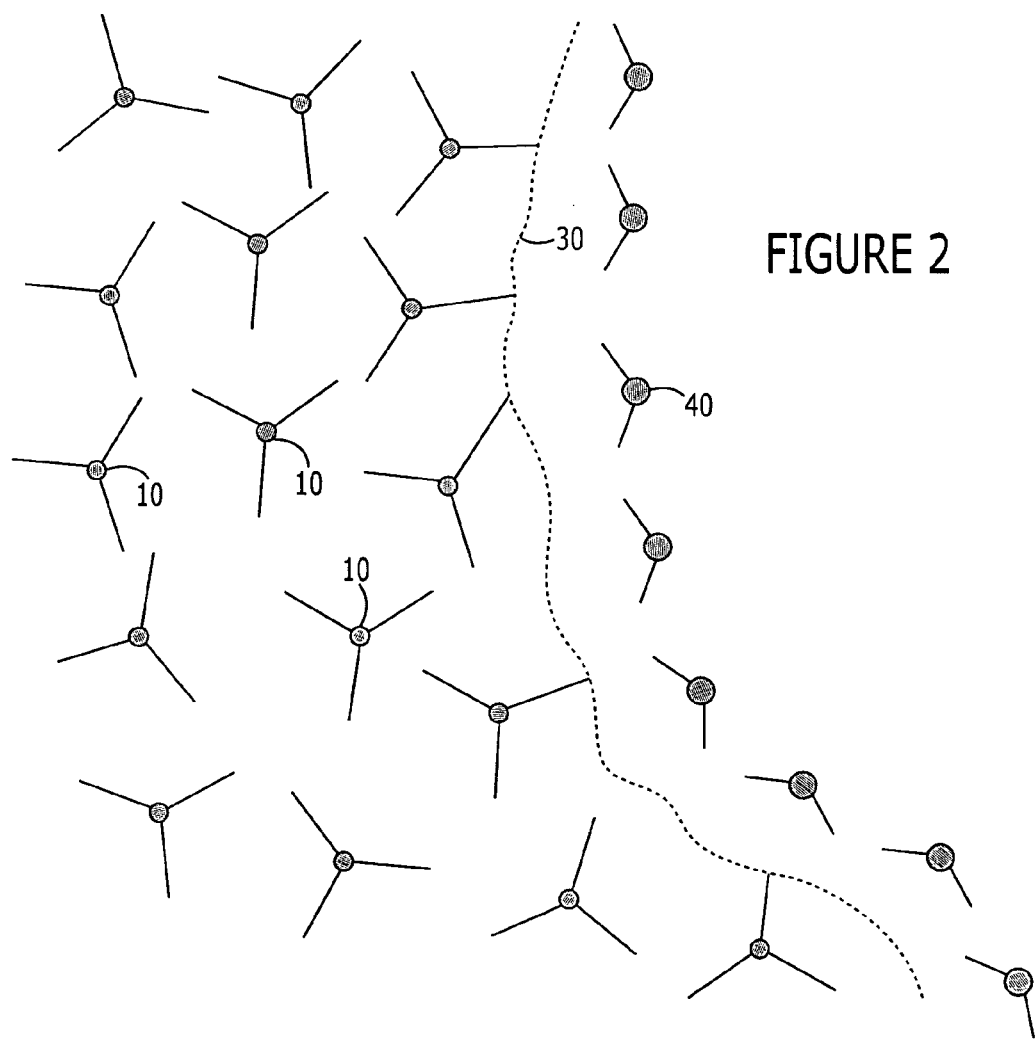
FIG. 2 is a diagram illustrating portions of a terrestrial network according to second embodiments of the present invention.

Thus, as shown in FIG. 2, at least one peripheral ATC base station may be a receive-only base station 40, which may include the same number of sectors and/or receive antenna elements as the interior ATC base stations 10 or, as shown in FIG. 2, may include fewer sectors, fewer receive antenna elements and/or different receive antenna elements compared to the interior ATC base stations 10. It also will be understood that, as with the reduced sector and/or reduced antenna element peripheral base stations 20 of FIG. 1, the receive-only base stations 40 of FIG. 2 need not be identical in their number of sectors and/or antenna elements, and more than one row of receive-only base stations 40 may be provided. Moreover, at Least some of the receive-only base stations 40 may communicate with an adjacent or non-adjacent interior ATC base station 10 or may communicate with the ATC infrastructure. Moreover, combinations of peripheral base stations 20 and 40 of FIGS. 1 and 2 may be provided according to other embodiments of the present invention.

Accordingly, embodiments of the present invention provide a plurality of base stations that are configured to wirelessly communicate with a plurality of radioterminals using at least one satellite radiotelephone frequency. The plurality of base stations include at least one interior base station that is located in an interior portion of the ATC service area and at least one peripheral base station that is located at a periphery of the ATC service area. At least one peripheral base station has fewer sectors, fewer antenna elements, different antenna elements, different gain patterns, and/or different EIRP than at least one interior base station. In other embodiments, at least one interior base station is at least one transmit and receive interior base station, and the ATC further includes at least one receive-only peripheral base station.

Other embodiments of the present invention can configure at least one peripheral base station 20 of an ATC, at the perimeter or fringes 30 of an ATC service area to reduce or avoid serving radioterminals that are beyond its engineered service footprint. This may be accomplished in a variety of ways including orienting some sectors of base stations to illuminate areas that are within the ATC service footprint while disabling other sectors that may illuminate areas away from the ATC service footprint. Such disabled sectors can be configured as receive-only sectors. In some embodiments, the signals that are received at a receive-only sector may also be received by at least one other transmit and receive sector and may be combined, using conventional techniques.

As such, a radioterminal that may be drifting away from the core ATC service footprint, while continuing to communicate with a base station by receiving on the side-lobes of an enabled sector, may transmit back to that base station via the main lobe (or substantially via the main lobe) of a receive-only sector that is oriented toward it. In this configuration, the forward link to the radioterminal generally will be a much weaker link than the return link, and service to that radioterminal generally will terminate due to forward link "breakage" before the radioterminal is at a distance that may require it to radiate maximum or near maximum power. Thus, a sharp decrease in base station forward-link signal power may be established at an edge of an ATC service area by judiciously configuring the sectors of base stations 20 that are at or near the edge.

The front-to-back EIRP ratio of an ATC base station antenna may be, per the ATC Rules, approximately 25 dB (see 47 CFR 25.253 (e)). Thus, a base station that is located at (or near) the edge of an ATC service footprint can have at least one of its (typically three) sectors transmit-disabled. In other words, the sector(s) that would have pointed away from the ATC service footprint can be disabled in their ability to transmit. For such a base station, a user who is in an un-served area (an area that would have been served by one of the transmit-disabled sectors) generally will experience significant forward-link signal attenuation (of the order of 25 dB) relative to a user who is at the same distance from the base station tower and within a transmit-enabled sector. With a forward link disadvantage of approximately 25 dB, the base station service radius in the direction of a receive-only sector may shrink to less than two tenths of what it would have been otherwise. It follows that, in some embodiments, a radioterminal that is within a receive-only sector and outside the influence of any signal attenuating structures may radiate, subject to closed-loop power control, approximately 25 dB less than it would have radiated at the edge of a symmetrically engineered ATC sector.

Figure 3:
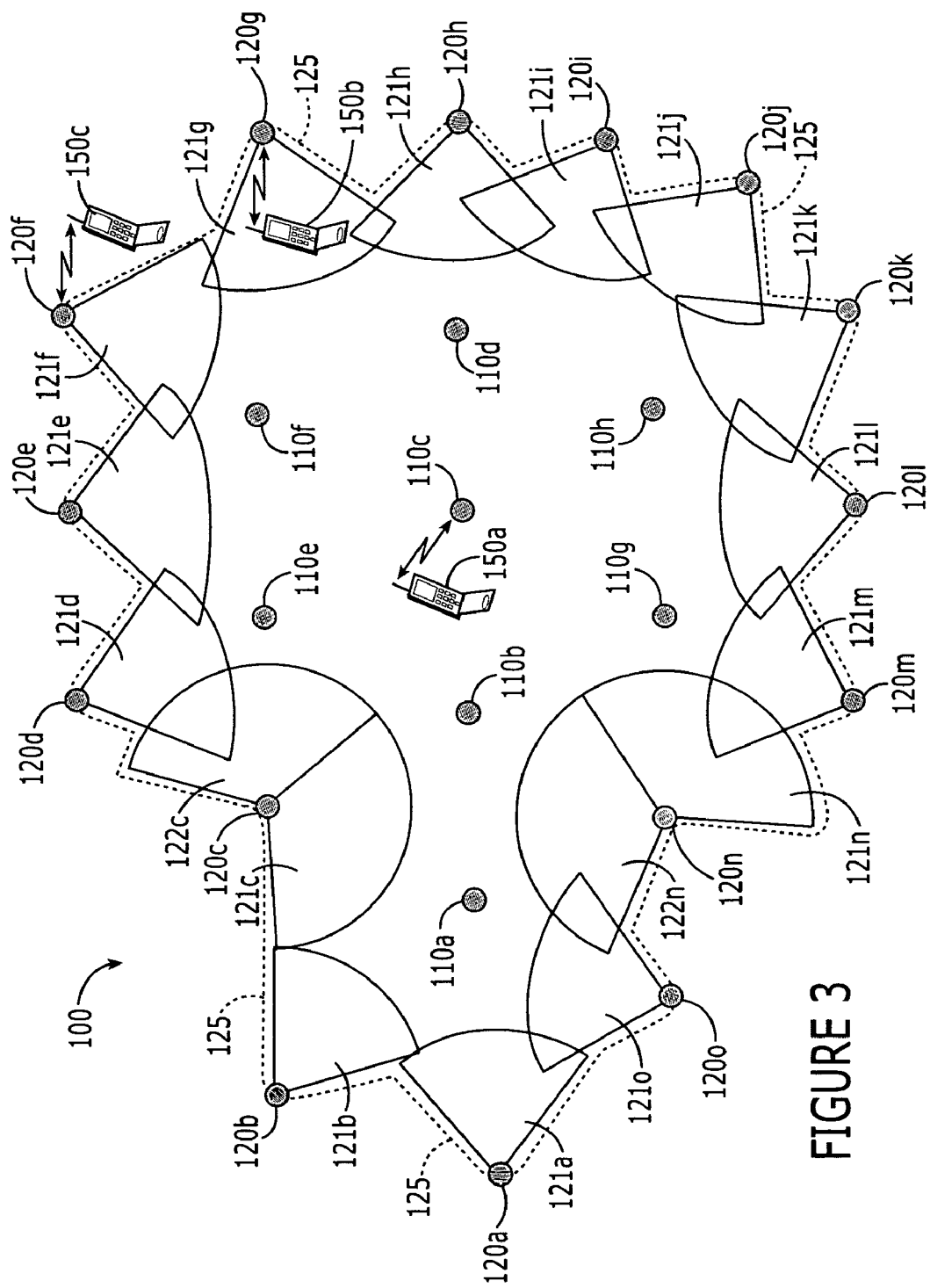
FIG. 3 is a diagram illustrating a terrestrial network according to third embodiments of the present invention.

According to additional embodiments of the present invention, as illustrated in FIG. 3, a terrestrial communications network 100 may include a plurality of interior and peripheral base stations 110*a*-*h* and 120*a*-*o* respectively providing communications service for radioterminals 150 over a terrestrial network coverage area. The interior base stations 110 provide communications service for radioterminals 150 in an interior portion of the terrestrial network coverage area, and the peripheral base stations 120 provide communications service for radioterminals at peripheral portions of the terrestrial network coverage area. More particularly, at least one of the peripheral base stations 120 may provide transmissions directed toward an interior portion of the terrestrial network coverage area with greater EIRP (power) than transmissions directed away from interior portions of the terrestrial network coverage area. For example, at least one of the peripheral base stations may have fewer transmit sectors, fewer transmit antenna elements, different transmit and/or receive antenna elements, and/or different transmit and/or receive gain patterns and/or parameters than at least one of the interior base stations.

More particularly, at least one interior base station(s) 110 may define a plurality of sectors surrounding the interior base station, and at least one interior base station(s) 110 may direct transmissions to all sectors surrounding the respective interior base station(s) so that transmissions are directed over a 360 degree pattern surrounding the respective interior base station(s). For example, one of the interior base stations may include directional transmit antennas configured to provide transmissions over a 120 degree sector, and the base station may include at least three such directional antennas so that transmissions are directed over three 120 degree sectors to cover a 360 degree pattern surrounding the base station. In addition or in an alternative, one or more interior base stations 110 may include omnidirectional antennas and/or directional antennas. At least one of the interior base stations may also be configured so that transmissions are directed to a pattern of less than 360 degrees surrounding the at least one interior base station. Transmission patterns and/or sectors are not shown for the interior base stations 110 of FIG. 3 for the sake of clarity.

As discussed above, at least one of the peripheral base stations 120 may provide transmissions directed toward an interior portion of the terrestrial network coverage area with greater EIRP (power) than transmissions directed away from interior portions of the terrestrial network coverage area. More particularly, at least one of the peripheral base stations may include one or more, directional transmit antennas each providing transmissions to a sector, such as a 120 degree sector. Moreover, the directional transmit antenna(s) on a peripheral base station 120 may be oriented such that transmissions from the peripheral base station 120 are directed over a sector (or sectors) oriented substantially toward interior portions of the terrestrial network coverage area with greater EIRP (power) than is directed over a sector (or sectors) oriented substantially away from interior portions of the terrestrial network coverage area.

By way of example, the peripheral base stations 120 may respectively include one or more directional transmit antennas configured to provide transmissions to a respective 120 degree transmit sector 121a-o or 122c or 122n. In the example of FIG. 3, for the base stations 120a-b, 120d-m, and 120o, one or more directional transmit antennas at each base station may be configured to provide transmissions to radioterminals in a single respective 120 degree sector 121a-b, 121d-m, and 120o. Moreover, for the base stations 120c and 120n, directional transmit antennas at each base station may be configured to provide transmissions to radioterminals in two respective 120 degree sectors 121c, 122c, 121n, and 122n. Accordingly, the peripheral base stations 120a-o may define a perimeter 125 (illustrated by the dotted line of FIG. 3) of the terrestrial network coverage area such that interior base stations 110 are located on one side of the perimeter 125 and not on the other side of the perimeter 125. As illustrated by the dotted line of FIG. 3, the perimeter 125 may substantially follow boundaries of sectors to which the peripheral base stations 120 transmit. The transmit sectors of the peripheral base stations may define the peripheral portions of the terrestrial network coverage area, and areas bounded by the peripheral portions may define the interior portions of the terrestrial network coverage area.

In addition, the peripheral base stations 120a-o may include directional receive antennas defining receive coverage sectors that span a full 360 degree pattern surrounding each of the peripheral base stations. For example, the peripheral base stations 120a-b, 120d-m, and 120o may include directional transmit antennas that substantially transmit to a single respective 120 degree sector 121a-b, 121d-m, and 121o, without substantially transmitting to sectors covering the remaining 240 degrees surrounding the base station. Similarly, the peripheral base stations 120c and 120n may include directional transmit antennas that substantially transmit to two 120 degree sectors without substantially transmitting to the remaining 120 degree sector surrounding the base station. The peripheral base stations, however, may include directional receive antennas configured to receive communications from radioterminals in the sectors 121a-o and 122c and 122n to which the peripheral base stations transmit as well as directional receive antennas configured to receive communications from radioterminals in sectors to which the peripheral base stations substantially do not transmit. In an alternative or in addition, one or more of the peripheral base stations may include one or more omnidirectional receive antenna(s).

Accordingly, interior and exterior base stations 110 and 120 may provide communications services for radioterminals in a coverage area and/or sector thereof using, for example, air interface protocols and/or architectures such as FDM/FDMA (frequency division multiplexed/multiple access), TDM/TDMA (time division multiplexed/multiple access), CDM/CDMA (code division multiplexed/multiple access), and/or OFDM/OFDMA (orthogonal frequency division multiplexed/multiple access). Moreover, the base stations of the terrestrial communications network 100 may employ a frequency reuse and/or spreading code reuse pattern to increase an efficiency of frequency usage and/or capacity and/or reduce interference. For example, each base station may have a relatively small coverage area and/or sector and adjacent base stations and/or sectors may use different frequencies and/or spreading codes to reduce interference therebetween.

Communications for a radioterminal 150a in an interior portion of the terrestrial network coverage area may be provided by an interior base station 110c as illustrated in FIG. 3. As the radioterminal 150a changes position within the terrestrial network coverage area during a communication such as a radiotelephone conversation, communications services for the radioterminal 150a may be handed off from one sector of base station 110c to another sector of base station 110c, and/or to sectors of other interior or peripheral base stations.

Communications for a radioterminal 150b in the peripheral portion of the terrestrial network coverage area may be provided by a peripheral base station 120g. As the radioterminal 150b is in the sector 121g, to which transmit and receive antennas of the base station 120g are directed, communications can be provided for the radioterminal 150b within the sector 121g. Moreover, communications services for the radioterminal 150b may be handed off from the base station 120g to an adjacent interior or peripheral base station if the radioterminal 150b moves from the sector 121g to a sector of another base station.

As shown in FIG. 3, the sectors of peripheral base stations may appear to have fixed boundaries defined by the transmit sectors of the respective transmit antennas. As will be understood, however, side lobes of the radiation patterns generated by the directional transmit antennas of the peripheral base stations may have sufficient energy to support acceptable link transmissions to a radioterminal 150c outside the perimeter 125 of the terrestrial network coverage area and outside the sector 121f of the peripheral base station 120f. As discussed above, the peripheral base station 120f may include receive antennas, that may, for example, be directional, supporting robust link reception of communications from the mobile terminal outside sector 121f.

Accordingly, communications service for the radioterminal 150c may initially be provided by the base station 120f within sector 121f, but the radioterminal 150c may then move outside the sector 121f and away from the terrestrial network coverage area. According to embodiments of the present invention, down-link transmissions from the base station 120f to the radioterminal 150c may continue to be provided by the directional antenna(s) servicing the sector 121f, and the quality of the down-link communications received by the radioterminal 150c may rapidly deteriorate. A relatively high quality of up-link communications received by the base station 120f from the radioterminal 150c, however, may be maintained as the radioterminal 150c moves outside sector 121f, because the base station 120f includes receive antennas covering a full 360 degree pattern surrounding the base station 120f. Accordingly, communications service for the radioterminal 150c will most likely be terminated due to deterioration in the down-link from the peripheral base station 120f to the radioterminal before significant deterioration in the up-link from the radioterminal 150c to the base station 120f occurs which may cause the radioterminal to radiate at, or near, maximum power.

By providing sectors outside the perimeter 125 wherein a peripheral base station can receive via antennas operative in these sectors up-link communications from a radioterminal without transmitting communications to the radioterminal via antennas operative in these sectors, communications with the radioterminal may be terminated without causing the radioterminal to increase its transmit power to a maximum, or near a maximum before termination. More particularly, in a closed loop power control system, the base station may request that the radioterminal increase its transmission power as the signal strength and/or quality of communications received by the base station decreases, and similarly, the radioterminal may request that the base station increase its transmission power as the signal strength and/or quality of communications received by the radioterminal decreases. Once the radioterminal 150c moves outside the sector 121f, a strength and/or quality measure of base station transmissions outside the sector 121f may decrease due to the directional nature of the base station transmit antenna(s) and due to the limited maximum EIRP (power) capability of the base station. The base station, however, may not request any, or any significant, power increases from the radioterminal because at least one base station receive antenna is directed outside the perimeter 125. To increase further the available return link margin between a radioterminal and a base station and thus further reduce the transmit power of a radioterminal, at least one antenna sub-system of a peripheral and/or interior base station may be configured to receive in more than one spatial orientation, such as in a vertical and horizontal orientation (polarization diversity reception) and, in addition or in an alternative, may also be configured with more than one spatially distinct elements (space-diversity reception).

According to additional embodiments of the present invention, one or more of the peripheral base stations 120a-o may be located proximate to an airport, a navigable waterway, or other region likely to include satellite communications terminals that may be communicating with a satellite. For example, one or more peripheral base stations 120a-o may be located proximate to a boundary of an airport with at least one transmit sector of the peripheral base station(s) proximate to the boundary of the airport being directed away or substantially away from the airport and/or having a reduced EIRP relative to other sectors. An area proximate to an airport may also be served by configuring at least one base station having at least one transmit sector whose antenna is oriented to point and/or radiate substantially in a southern direction. Providing communications service to an area proximate to an airport with at least one base station sector that is oriented to point and/or radiate in a substantially southern direction may increase and/or maximize the antenna discrimination between a satellite terminal (that may also be operative with its antenna oriented in a substantially southern direction due to the location of an orbital slot of a geostationary satellite) and the base station sector. (It will be understood that a base station sector that may be providing communications service to an area proximate to an airport that is located below the earth's equator may be oriented to point and/or radiate substantially in a northern direction since relative to a satellite terminal that is located at or near the airport (below the earth's equator) a geo-stationary satellite orbital location may be at a northern or substantially northern direction.)

The at least one transmit sector of the peripheral base station(s) proximate to the airport being directed away or substantially away from the airport and/or configured to radiate substantially in a southern direction may also have a reduced EIRP value relative to other base station sectors of the same or other base stations. At least one transmit sector of the peripheral and/or interior base stations(s) proximate and/or distant to the airport may also be configured with a Left-Hand Circularly Polarized (LHCP) antenna to further maximize a discrimination between the antenna systems of the at least one transmit sector and a satellite terminal that is configured with a Right-Hand Circularly Polarized (RHCP) receive antenna. Accordingly, interference with satellite communications terminals (aeronautical or other) that may be operating at or near the airport resulting from base station transmissions can be reduced or eliminated. The interior base stations can thus be located on a first side of the perimeter 125, and the peripheral base stations 120a-o may be located such that the airport is on a second side of the perimeter 125.

In another example, one or more peripheral base stations 120a-o may be located proximate to a navigable waterway with at least one transmit sector of the peripheral base station(s) proximate to the navigable waterway being directed away or substantially away from the navigable waterway and/or pointed in a southern or substantially southern direction. Providing communications service to an area proximate to a navigable waterway (in the northern hemisphere) with at least one base station sector that is oriented in a southern or substantially southern direction and/or is configured to radiate in a southern or substantially southern direction may increase and/or maximize the antenna discrimination between a satellite terminal (that may also be operative with its antenna oriented in a substantially southern direction due to an orbital slot location of a geostationary satellite) and the base station sector. (It will be understood that a base station sector that may be providing communications service to an area proximate to a waterway that is located below the earth's equator (in the southern hemisphere) may be oriented to point and/or radiate substantially in a northern direction since relative to a satellite terminal that is located at or near the waterway (below the earth's equator) a geo-stationary satellite orbital location may be at a northern or substantially northern direction.).

The at least one transmit sector of the peripheral base station(s) proximate to the navigable waterway being directed to radiate away or substantially away from the navigable waterway and/or being directed to radiate in a southern or substantially southern direction may also have a reduced EIRP value relative to other base station sectors of the same or other base stations. At least one transmit sector of the peripheral and/or interior base station(s) proximate and/or distant to the navigable waterway may also be configured with a Left-Hand Circularly Polarized (LHCP) antenna to further maximize a discrimination between the antenna systems of the at least one transmit sector and a satellite terminal that is configured with a Right-Hand Circularly Polarized (RHCP) antenna. Accordingly, interference with satellite communications terminals at or proximate to the navigable waterway that may be operative, for example, on boats and/or ships in the navigable waterway, resulting from peripheral and/or interior base station transmissions can be reduced or eliminated. The interior base stations can thus be located on a first side of the perimeter 125, and the peripheral base stations 120a-o may be located such that the navigable waterway is on a second side of the perimeter 125.

According to some embodiments of the present invention, the terrestrial network 100 may be ancillary to a space based communications network providing radiotelephone communications using a satellite radiotelephone frequency band. Moreover, base stations of the terrestrial network 100 may reuse at least one frequency of the satellite frequency band, and the space based communications network may provide communications for radioterminals when outside the terrestrial network coverage area. Accordingly, as the radioterminal 150c moves away from the perimeter 125, communications with the radioterminal 150c may be handed off to the space based network and/or to an alternate terrestrial communications network such as a cellular and/or PCS terrestrial communications network.

The sharing of frequencies of a satellite frequency band between a space based communications network and a terrestrial communications network is discussed, for example, in the following U.S. patent and U.S. patent publications. Satellite radioterminal communications systems and methods that may employ terrestrial reuse of satellite frequencies are described, for example, in U.S. Pat. No. 6,684,057 to Karabinis, entitled Systems and Methods for Terrestrial Reuse of Cellular Satellite Frequency Spectrum; and Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies. All of the above referenced patent publications and patent are assigned to the assignee of the present invention, and the disclosures of all of these patent publications and patent are hereby incorporated herein by reference in their entirety as if set forth fully herein.

Figure 4:
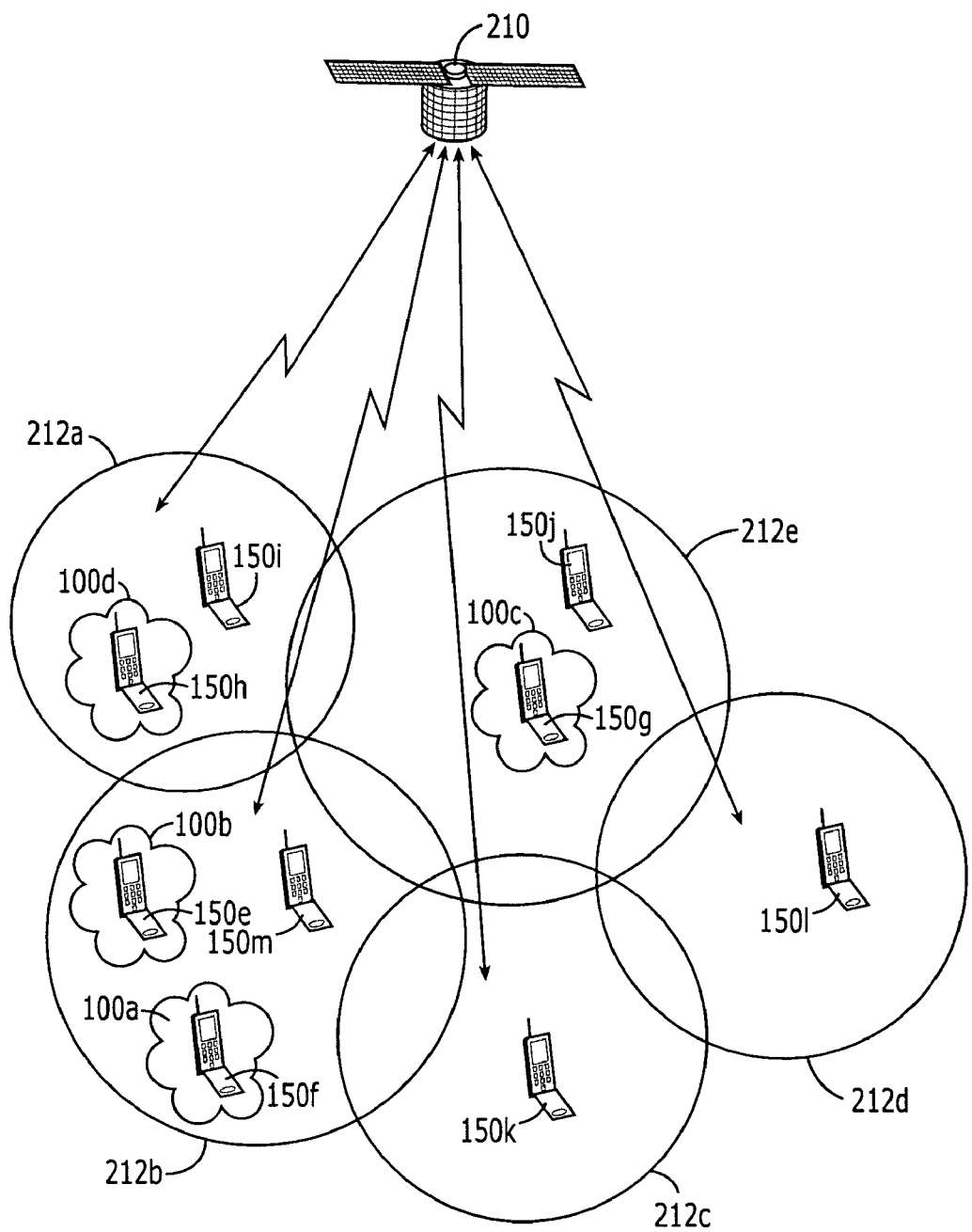
FIG. 4 is a diagram illustrating satellite and terrestrial communications networks sharing a satellite frequency band according to fourth embodiments of the present invention.

As shown in FIG. 4, a plurality of terrestrial communications networks 100a-d (for example, as discussed above with respect to FIG. 3) may be separated by no-service regions such that communications services are not provided by base stations of any of the terrestrial communications networks 100a-d in the no-service regions. Moreover, a space-based network including at least one satellite 210 may provide communications service for radioterminals outside coverage areas of terrestrial communications networks 100a-d and within satellite coverage areas 212a-e (such as radioterminals 150i-m) using frequencies of a satellite frequency band.

Frequencies of the satellite frequency band may be reused among the satellite coverage areas 212a-e such that, for example, the same frequencies of the satellite frequency band may not be reused to provide communications service in overlapping satellite coverage areas. Moreover, frequencies of the satellite frequency band may be reused within the terrestrial networks 100a-d such that, for example, the same frequencies may not be reused in a satellite coverage area and in a terrestrial network located in the satellite coverage area. For example, the space-based network may provide communications service for radioterminals in satellite coverage area 212a (such as radioterminal 150i) using at least a first frequency of the satellite frequency band, and the space-based network may provide communications for radioterminals in satellite coverage area 212b (such as radioterminal 150m) using a second frequency of the satellite frequency band. In addition, the terrestrial network 100d (or at least a portion thereof) is within the first satellite coverage area 212a, and the terrestrial network 100d is outside the satellite coverage area 212b. Accordingly, at least one base station of the terrestrial network 100d may provide communications service for radioterminals in a coverage area thereof (such as radioterminal 150h) using the second frequency of the satellite frequency band, and none of the base stations of the terrestrial network 100d may provide communications service using the first frequency of the satellite frequency band.

Similarly, base stations of terrestrial networks 100a-b may provide communications service for radioterminals in a coverage area thereof (such as radioterminals 150e-f) using frequencies of the satellite frequency band other than frequencies used by the space based network to provide communications service over satellite coverage area 212b. Moreover, base stations of terrestrial network 100c may provide communications service for radioterminals in a coverage area thereof (such as radioterminal 150g) using frequencies of the satellite frequency band other than frequencies used by the space based network to provide communications service over satellite coverage area 212e.

More particularly, the satellite frequency band may include down-link frequencies and up-link frequencies. Down-link frequencies may be used by the base stations of the terrestrial network(s) and by the satellite(s) of the space based network to transmit communications to radioterminals. Up-link frequencies may be used by the base stations of the terrestrial network(s) and by the satellite(s) of the space based network to receive communications from radioterminals. Accordingly, base stations of terrestrial network(s) may share a satellite frequency band with the space based network, but base stations of the terrestrial network(s) may not transmit on frequencies that are received by the space based network. Accordingly, base stations of the terrestrial networks sharing frequencies of the satellite frequency band may not interfere with frequencies received by the space based network. For example, the space based network may transmit communications to radioterminals in the satellite coverage area 212a using a first frequency of the satellite frequency band, the space based network may transmit to radioterminals in the satellite coverage area 212b using a second frequency of the satellite frequency band, and at least one base station of the terrestrial network 100d may transmit communications using the second frequency of the satellite frequency band.

Similarly, the space based network may receive communications from radioterminals in the first satellite coverage area 212a using a third frequency of the satellite frequency band, and the space based network may receive communications from radioterminals in the satellite coverage area 212*b* using a fourth frequency of the satellite frequency band. Moreover, at least one base station of the terrestrial network 100*d* may receive communications from radioterminals using the fourth frequency of the satellite frequency band, and none of the base stations of the terrestrial network 100*d* may receive communications from radioterminals that are communicating therewith using the third frequency of the satellite frequency band (at least some of the base stations of terrestrial network 100*d* may also be configured to receive communications from radioterminals in the first satellite coverage area 212*a* using the third frequency of the satellite frequency band to communicate with the space based network).

A first radioterminal may thus transmit communications to a peripheral base station of the terrestrial network 100*d* using the fourth frequency and a second radioterminal in satellite coverage area 212*b* may transmit to the space based network using the fourth frequency. As discussed above with respect to FIG. 3, communications between the first radioterminal and the terrestrial network may be terminated without increasing a transmit power of the first radioterminal to a maximum, or near maximum, level because the peripheral base station provides transmissions directed toward an interior portion of the coverage area of the terrestrial network 100*d* with greater EIRP (power) than transmissions directed away from interior portions of the terrestrial network 100*d* coverage area. Accordingly, interference from the first radioterminal with transmissions from the second radioterminal in the satellite coverage area 212*b* to the space base network may be reduced.

Figure 5:
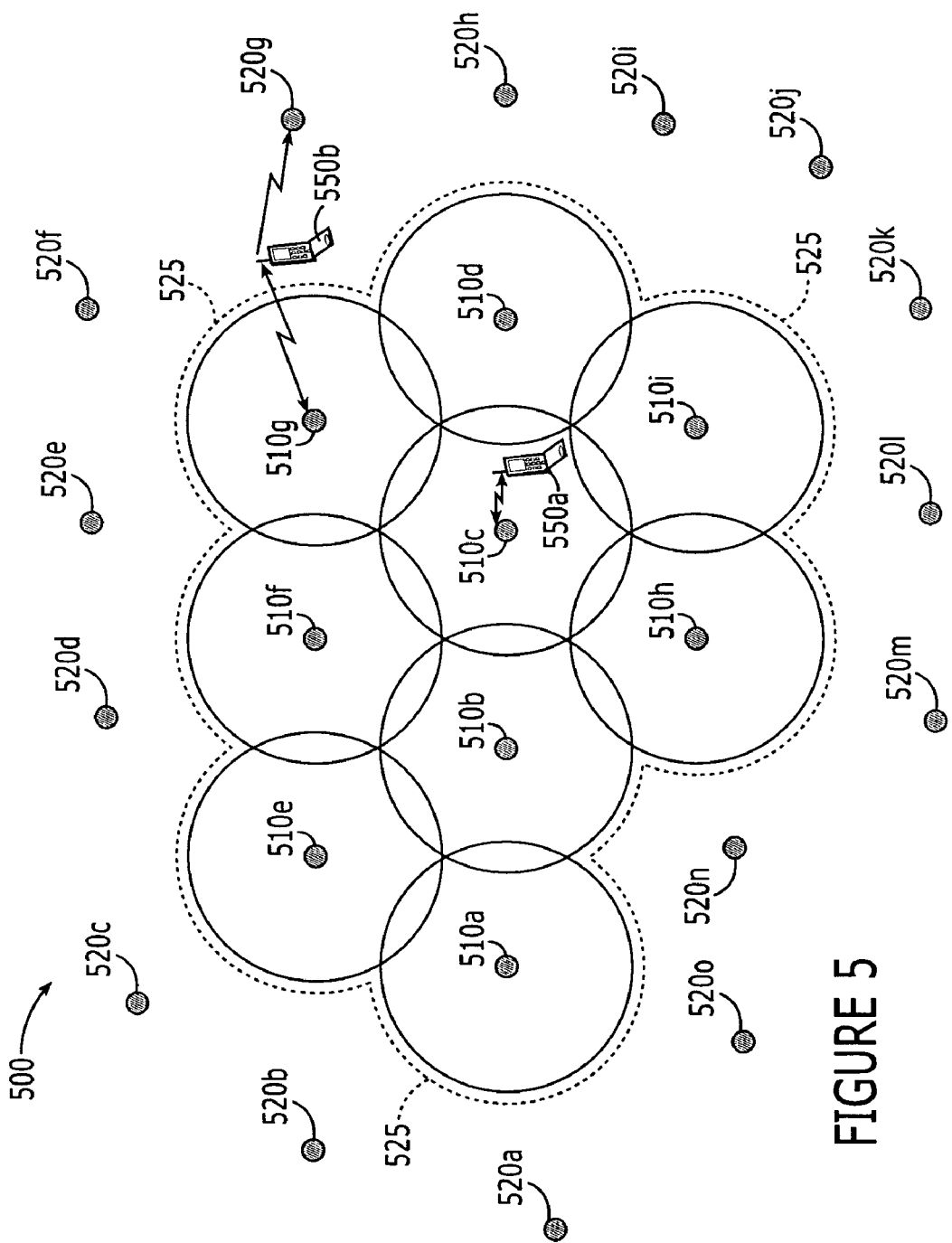
FIG. 5 is a diagram illustrating a terrestrial network according to fifth embodiments of the present invention.

According to still additional embodiments of the present invention, as illustrated in FIG. 5, a terrestrial communications network 500 may include a plurality of interior and peripheral base stations 510*a-i* and 520*a-o* providing communications service for radioterminals 550 over a terrestrial network coverage area. The interior base stations 510 provide communications service (both transmitting down-link communications to radioterminals and receiving up-link communications from radioterminals) for radioterminals 550 in an interior portion of the terrestrial network coverage area. In contrast, the peripheral base stations 520 may only receive up-link communications from radioterminals. Stated in other words, at least one of the peripheral base stations 520 may be a receive-only base station.

More particularly, at least one of the interior base stations 510 may define a plurality of sectors surrounding the at least one interior base station, and the at least one interior base station(s) 510 may direct transmissions to all sectors surrounding the interior base station so that transmissions are directed over a 360 degree pattern surrounding the respective interior base station. For example, one of the interior base stations may include directional transmit antennas configured to provide transmissions over a 120 degree sector, and the base station(s) may include at least three such directional antennas so that transmissions are directed over three 120 degree sectors to cover a 360 degree pattern surrounding the base station. In addition or in an alternative, one or more interior base stations 510 may include omnidirectional antennas and/or directional antennas. At least one of the interior base stations may also be configured so that transmissions are directed to a pattern of less than 360 degrees surrounding the at least one interior base station. Complete transmission patterns and/or sectors are not shown for the interior base stations 510 of FIG. 5 for the sake of clarity.

As discussed above, at least one of the peripheral base stations 520 may be a receive-only base station(s). More particularly, peripheral base stations may include one or more receive antennas providing reception capability to at least one sector, such as a 120 degree sector. Moreover, the receive antenna(s) on a peripheral base station 520 may be oriented such that reception for the peripheral base station 520 is directed over a sector oriented substantially toward interior portions of the terrestrial network coverage area with greater sensitivity than is directed over a sector oriented substantially away from interior portions of the terrestrial network coverage area. In an alternative, a peripheral base station 520 may include receive antennas directed over two or more sectors oriented substantially toward interior portions of the terrestrial network coverage area, and/or a peripheral base station 520 may include receive antennas directed over a plurality of sectors covering a 360 degree pattern surrounding the peripheral base station 520. An engineered boundary of coverage areas of the interior base stations 510 may define a perimeter 525 (illustrated by the dotted line of FIG. 5) of the terrestrial network coverage area such that interior base stations 510 are located on one side of the perimeter 525 and not on the other side of the perimeter 525. In an alternative or in addition, one or more of the peripheral base stations may include one or more omnidirectional receive antennas and/or one or more directional receive antennas.

Accordingly, interior and exterior base stations 510 and 520 may provide communications services for radioterminals in a coverage area and/or sector thereof using, for example, FDM/FDMA (frequency division multiplexed/multiple access), TDM/TDMA (time division multiplexed/multiple access), CDM/CDMA (code, division multiplexed/multiple access) architecture, and/or OFDM/OFDMA (orthogonal frequency division multiplexed/multiple access). Moreover, the base stations of the terrestrial communications network 500 may employ a frequency reuse and/or spreading code reuse pattern to increase an efficiency of frequency usage and/or capacity and/or reduce interference. For example, each base station may have a relatively small coverage area and/or sector and adjacent base stations and/or sectors may use different frequencies and/or spreading codes to reduce interference therebetween.

Communications service for a radioterminal 550*a* in an interior portion of the terrestrial network coverage area may be provided by an interior base station 510*c* as illustrated in FIG. 5. As the radioterminal 550*a* moves within the terrestrial network coverage area during a communication such as a radiotelephone conversation, communications services for the radioterminal 550*a* may be handed off from one sector of base station 510*c* to another sector of base station 510*c*, and/or to sectors of other interior and/or peripheral base stations. More particularly, a down-link for transmissions to the radioterminal 510*a* and an up-link for transmissions from the radioterminal may be provided by one or more interior base stations as long as the radioterminal is within a coverage area of one of the interior base stations.

As shown in FIG. 5, the engineered coverage areas of interior base stations 510 may appear to have fixed boundaries defined by the transmit sectors of the respective transmit antennas. As will be understood, however, radiation patterns generated by transmit antennas, such as by the transmit antennas of the interior base station 510*g*, may have sufficient energy to support transmissions to a radioterminal 550*b* outside the perimeter 525 of the terrestrial network engineered coverage area. As discussed above, the peripheral base station 520*g* may include receive antennas supporting robust link reception of communications from the mobile terminal 550*b* outside the perimeter 525.

Accordingly, communications service for the radioterminal 550*b* may initially be provided by the interior base station

510g, but the radioterminal 550b may then move outside the engineered coverage area of interior base station 510g, outside the perimeter 525, and away from the terrestrial network engineered coverage area. According to embodiments of the present invention, transmissions from the base station 510g to the radioterminal 550b may continue to be provided by the transmit antenna(s) of interior base station 510g, and the quality of the communications received by the radioterminal 550b may deteriorate. A relatively high quality of communications received by the peripheral base station 520g from the radioterminal 550b, however, may be maintained as the radioterminal 550b moves outside the engineered coverage area of interior base station 510g. Accordingly, communications service for the radioterminal 550b will most likely be terminated due to deterioration in the down-link from the interior base station 510g to the radioterminal 550b before significant deterioration in the up-link from the radioterminal 550b to the base station 520g occurs. (In an alternative, base station 520g and base station 510g may be configured to combine their corresponding receptions from a radioterminal such as their receptions from radioterminal 550b.) Accordingly, down-link communications to the radioterminal 550b and up-link communications from the radioterminal may be provided using different base stations when the radioterminal 550b is outside the engineered terrestrial network service perimeter 525.

By providing receive-only peripheral base stations outside the perimeter 525 that can receive communications from a radioterminal, communications with the radioterminal can be terminated without causing the radioterminal to boost its transmit power to a maximum, or a near maximum, level before termination. More particularly, in a closed loop power control system, a terrestrial network infrastructure such as, for example, a base station (or base stations) may request that the radioterminal increase its transmission power as the quality of communications received by the infrastructure (base station or base stations) decreases, and similarly, the radioterminal may request that an infrastructure, such as, for example, a base station, providing communications information to the radioterminal increase its transmission power as the quality of communications received by the radioterminal decreases. Once the radioterminal 550b moves substantially outside the engineered coverage area of interior base station 510g, and because the EIRP (power) from the base station 510g may be limited to a predetermined maximum, a strength and/or quality measure of base station transmissions outside the engineered coverage area thereof may decrease. An infrastructure of the terrestrial communications network, however, such as base station 510g, may not request any, or any significant, power increases for transmissions from the radioterminal 550b that is outside of the network's engineered limit(s) because receive antennas from the base station 520g (and/or 510g) may be configured to cover the areas outside of perimeter 525 not covered by transmit and/or receive antennas of base station 510g in accordance with the system's engineered limits and/or parameters. That is, for at least some areas outside of perimeter 525 base station 510g on its own, without aid of peripheral base station 520g, may not provide X dB (i.e., 18 dB) of return-link structural attenuation margin.

According to additional embodiments of the present invention, one or more of the peripheral base stations 520a-o may be located proximate to an airport, a navigable waterway, or other region likely to include satellite communications terminals. For example, one or more peripheral base stations 520a-o may be located proximate to a boundary of an airport with the peripheral base station(s) being located between one or more of the interior base stations 510a-i and the airport. Accordingly, interference with satellite communications terminals in airplanes at the airport resulting from base station transmissions of the terrestrial network 500 can be reduced. The interior base stations 510a-i can thus be located on a first side of the perimeter 525, and the peripheral base stations 520a-o may be located such that the airport is on a second side of the perimeter 525. Moreover, one or more of the peripheral base stations may be between the perimeter 525 and the airport. In another example, one or more peripheral base stations 520a-o may be located proximate to a navigable waterway with one or more of the peripheral base stations 520a-o being located between one or more of the interior base stations 510a-i and the waterway. Accordingly, interference with satellite communications terminals on boats and/or ships in the navigable waterway resulting from base station transmissions of the terrestrial network 500 can be reduced. The interior base stations can thus be located on a first side of the perimeter 525, and the peripheral base stations 520a-o may be located such that the navigable waterway is on a second side of the perimeter 525. Moreover, one or more of the peripheral base stations 520a-o may be between the perimeter 525 and the waterway.

According to some embodiments of the present invention, the terrestrial network 500 may be ancillary to a space based communications network providing radiotelephone communications using a satellite radiotelephone frequency band. Moreover, base stations of the terrestrial network 500 may reuse at least one frequency of the satellite frequency band, and the space based communications network may provide communications for radioterminals when outside the terrestrial network coverage area. Accordingly, as the radioterminal 550b moves away from the perimeter 525, communications with the radioterminal 550b may be handed off to the space based network and/or to an alternative terrestrial communications network such as a cellular and/or PCS terrestrial communications network.

The sharing of frequencies of a satellite frequency band between a space based communications network and a terrestrial communications network is discussed, for example, in the following U.S. patent and U.S. patent publications. Satellite radioterminal communications systems and methods that may employ terrestrial reuse of satellite frequencies are described, for example, in U.S. Pat. No. 6,684,057 to Karabinis, entitled Systems and Methods for Terrestrial Reuse of Cellular Satellite Frequency Spectrum; and Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filtersfor Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies. All of the above referenced patent publications and patent are assigned to the assignee of the present invention, and the disclosures of all of these patent publications and patent are hereby incorporated herein by reference in their entirety as if set forth fully herein.

Figure 6:
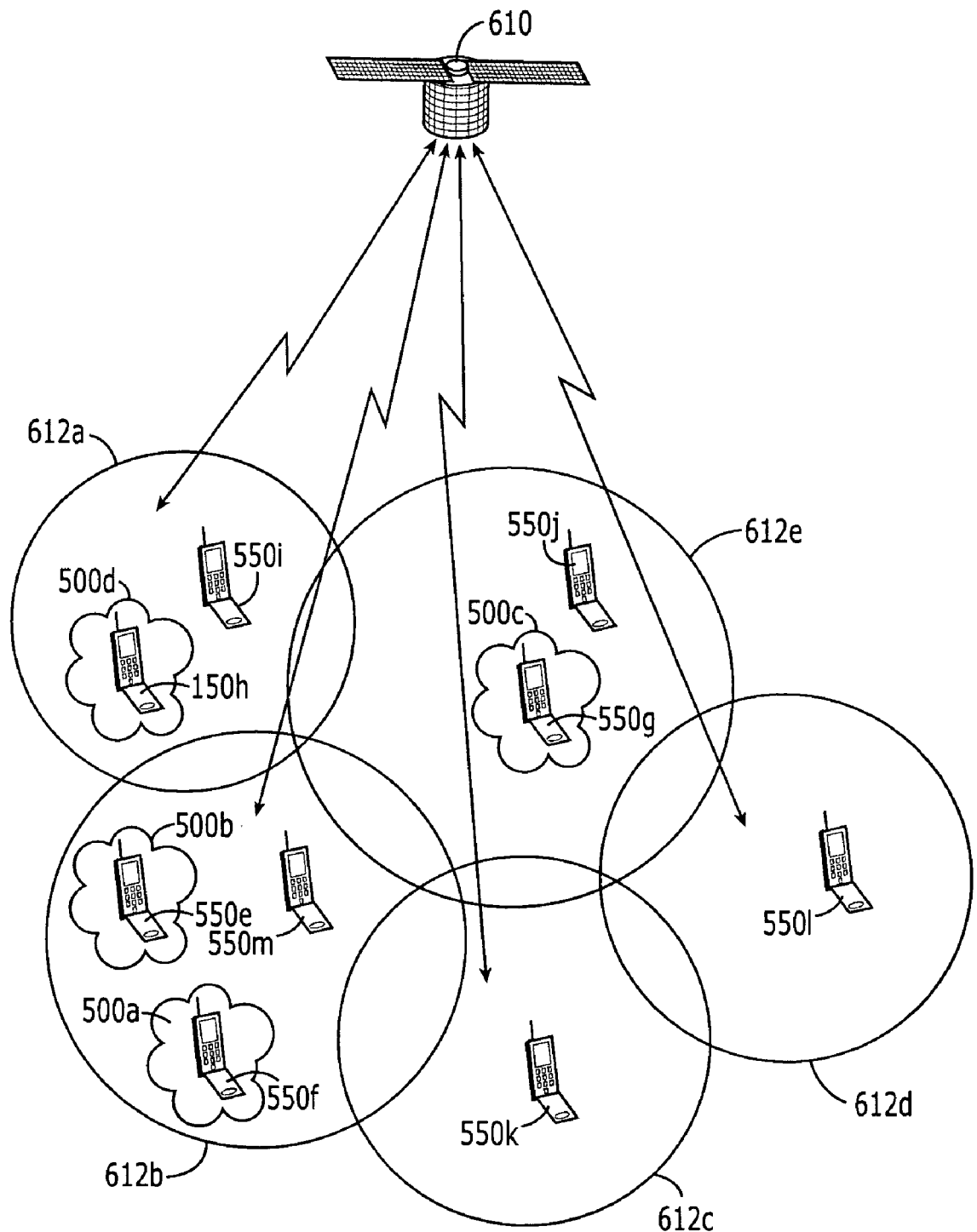
FIG. 6 is a diagram illustrating satellite and terrestrial communications networks sharing a satellite frequency band according to sixth embodiments of the present invention.

As shown in FIG. 6, a plurality of terrestrial communications networks 500a-d (as discussed above with respect to FIG. 5) may be separated by no-service regions such that communications services are not provided by base stations of any of the terrestrial communications networks 500a-d in the no-service regions. Moreover, a space-based network including at least one satellite 610 may provide communications service for radioterminals outside coverage areas of terrestrial communications networks 500a-d and within satellite coverage areas 612a-e (such as radioterminals 550i-m) using frequencies of a satellite frequency band.

Frequencies of the satellite frequency band may be reused among the satellite coverage areas 612a-e such that, for example, the same frequencies of the satellite frequency band are not reused to provide communications service in overlapping satellite coverage areas. Moreover, frequencies of the satellite frequency band may be reused within the terrestrial networks 500a-d such that, for example, the same frequencies are not reused in a satellite coverage area and in a terrestrial network located in the satellite coverage area. For example, the space-based network may provide communications service for radioterminals in satellite coverage area 612a (such as radioterminal 550i) using at least a first frequency of the satellite frequency band, and the space-based network may provide communications for radioterminals in satellite coverage area 612b (such as radioterminal 550m) using a second frequency of the satellite frequency band. In addition, the terrestrial network 500d (or at least a portion thereof) is within the first satellite coverage area 612a, and the terrestrial network 500d is outside the satellite coverage area 612b. Accordingly, at least one base station of the terrestrial network 500d may provide communications service for radioterminals in a coverage area thereof (such as radioterminal 550h) using the second frequency of the satellite frequency band, and none of the base stations of the terrestrial network 500d may provide communications service using the first frequency of the satellite frequency band.

Similarly, base stations of terrestrial networks 500a-b may, for example, provide communications service for radioterminals in a coverage area thereof (such as radioterminals 550e-f) using frequencies of the satellite frequency band other than frequencies used by the space based network to provide communications service over satellite coverage area 612b. Moreover, base stations of terrestrial network 500c may, for example, provide communications service for radioterminals in a coverage area thereof (such as radioterminal 550g) using frequencies of the satellite frequency band other than frequencies used by the space based network to provide communications service over satellite coverage area 612e.

More particularly, the satellite frequency band may include down-link frequencies and up-link frequencies. Down-link frequencies may be used by the base stations of the terrestrial network(s) and by the satellite(s) of the space based network to transmit communications to radioterminals. Up-link frequencies may be used by the base stations of the terrestrial networks and by the satellite(s) of the space based network to receive communications from radioterminals. Accordingly, base stations of terrestrial networks may share a satellite frequency band with the space based network, but base stations of the terrestrial networks may not, for example, transmit on frequencies that are received by the space based network. Accordingly, base stations of the terrestrial networks sharing frequencies of the satellite frequency band may not interfere with frequencies received by the space based network. For example, the space based network may transmit communications to radioterminals in the satellite coverage area 612a using a first frequency of the satellite frequency band, the space based network may transmit to radioterminals in the satellite coverage area 612b using a second frequency of the satellite frequency band, and at least one base station of the terrestrial network 500d may transmit communications using the second frequency of the satellite frequency band.

Similarly, the space based network may receive communications from radioterminals in the first satellite coverage area 612a using a third frequency of the satellite frequency band, and the space based network may receive communications from radioterminals in the satellite coverage area 612b using a fourth frequency of the satellite frequency band. Moreover, at least one base station of the terrestrial network 500d may receive communications from radioterminals that it is transmitting communications to using the fourth frequency of the satellite frequency band, and none of the base stations of the terrestrial network 500d may receive communications from radioterminals that are communicating therewith using the third frequency of the satellite frequency band. (At least some of the base stations of the terrestrial network 500d may also be configured to receive communications from radioterminals in the first satellite coverage area 612a using the third frequency of the satellite frequency band to communicate with the space based network.)

A first radioterminal may thus transmit communications to a peripheral base station of the terrestrial network 500d using the fourth frequency and a second radioterminal in satellite coverage area 612b may transmit to the space based network using the fourth frequency. As discussed above with respect to FIG. 5, communications between the first radioterminal and the terrestrial network may be terminated without increasing a transmit power of the first radioterminal to a maximum, or near maximum, level because the peripheral receive-only base station provides at least one receive antenna directed toward an interior portion of the coverage area of the terrestrial network 500d such as to provide a high-quality return link for the first radioterminal. Accordingly, interference from the first radioterminal with transmission from the second radioterminal in the satellite coverage area 612b to the space base network can be reduced.

Moreover, elements of embodiments discussed above with respect to FIGS. 3-6 may be combined. For example, the terrestrial communications networks 100 of FIGS. 3 and/or 4 may include one or more receive-only base stations configured to receive communications from radioterminals outside the perimeter 125 (as discussed above with respect to peripheral base stations 520 of FIG. 5) thereby further enhancing up-link quality as compared to down-link quality outside the perimeter 125. In addition or in an alternative, a receive-only base station may be substituted for one or more of the peripheral base stations 120 of FIGS. 3 and/or 4.

Similarly, the terrestrial communications networks 500 of FIGS. 5 and 6 may include one or more base stations providing transmissions directed toward an interior portion of the terrestrial network coverage area with greater power than transmissions directed away from interior portions of the terrestrial network coverage area (as discussed above with respect to peripheral base stations 120 of FIG. 3). For example, a peripheral base station 120 as discussed above with respect to FIG. 3 may be substituted for one or more of the interior base stations 510*a-b*, 510*d*, 510*e-g*, or 510*h-i* along the perimeter 525. In addition or in an alternative, a peripheral base station 120 as discussed above with respect to FIG. 3 may be substituted for one or more of the peripheral base stations 520 of FIG. 5.

In the drawings and specification, there have been disclosed typical embodiments of the invention and, although specific terms are employed, they are used in a generic and descriptive sense only and not for purposes of limitation, the scope of the invention being set forth in the following claims. Moreover, while particular systems are discussed above with respect to the figures, analogous methods are also included in the present invention.

What is claimed is:

1. A wireless communications system comprising:
   a terrestrial network including a plurality of base stations providing communications service for radioterminals over a terrestrial network coverage area, the plurality of base stations including interior base stations providing communications service for radioterminals in an interior portion of the terrestrial network coverage area and peripheral base stations providing communications service for radioterminals at a peripheral portion of the terrestrial network coverage area, wherein at least one of the peripheral base stations provides transmissions directed toward an interior portion of the terrestrial network coverage area with greater power than transmissions directed away from interior portions of the terrestrial network coverage area; and
   a space based network comprising at least one satellite, the space based network providing communications service for radioterminals in a first satellite coverage area using a first frequency of a satellite frequency band and providing communications service for radioterminals in a second satellite coverage area using a second frequency of the satellite frequency band, wherein at least a portion of the terrestrial network coverage area is within the first satellite coverage area, wherein an entirety of the terrestrial network coverage area is outside the second satellite coverage area, and wherein at least one of the base stations provides communications service using the second frequency of the satellite frequency band, and refrains from providing communications service using the first frequency of the satellite frequency band.

2. A wireless communications system according to claim 1 wherein the peripheral base stations define a portion of a perimeter of the terrestrial network coverage area such that interior base stations of the terrestrial network are located on one side of the perimeter and not on the other side of the perimeter.

3. A wireless communications system according to claim 2 wherein the perimeter surrounds interior portions of the terrestrial network coverage area.

4. A wireless communications system according to claim 1 wherein an interior base station comprises a plurality of sectors and transmits communications over the plurality of sectors in a 360 degree pattern.

5. A wireless communications system according to claim 1 wherein a peripheral base station transmits over a sector thereof that is directed substantially toward an interior portion of the terrestrial network coverage area with greater power than a power used to transmit over another sector thereof that is directed substantially away from an interior portion of the terrestrial network coverage area.

6. A wireless communications system according to claim 5 wherein the peripheral base station includes a transmission antenna for a sector thereof that is directed substantially toward an interior portion of the terrestrial network coverage area and does not include a transmission antenna for a sector thereof that is directed substantially away from an interior portion of the terrestrial network coverage area.

7. A wireless communications system according to claim 6 wherein the peripheral base station includes a receive antenna for each sector thereof.

8. A wireless communications system according to claim 1 wherein a peripheral base station comprises fewer transmit sectors, fewer transmit antenna elements, different transmit antenna elements, and/or different transmit gain patterns than at least one interior base station.

9. A wireless communications system according to claim 1 further comprising:
   a second terrestrial network including a second plurality of base stations providing communications service for radioterminals over a second terrestrial network coverage area, wherein a no-service region separates the first and second terrestrial network coverage areas such that communications services are not provided by base stations of either of the first or the second terrestrial networks in the no-service region.

10. A wireless communications system according to claim 1 wherein the space based network transmits communications to radioterminals in the first satellite coverage area using the first frequency, wherein the space based network transmits communications to radioterminals in the second satellite coverage area using the second frequency, and wherein the at least one of the base stations transmits communications to radioterminals using the second frequency.

11. A wireless communications system according to claim 10 wherein the space based network receives communications from radioterminals in the first satellite coverage area using a third frequency, wherein the space based network receives communications from radioterminals in the second satellite coverage area using a fourth frequency, and wherein the at least one of the base stations receives communications using the fourth frequency, and refrains from using the third frequency to receive communications.

12. A wireless communications system according to claim 1 wherein the terrestrial network includes a base station comprising a receive-only sector so that communications service for a radioterminal is provided by the receive-only sector receiving communications from the radioterminal and by another sector transmitting communications to the radioterminal.

13. A wireless communications system comprising:
   a terrestrial network including a plurality of base stations providing communications service for radioterminals over a terrestrial network coverage area, the plurality of base stations including interior base stations providing communications service for radioterminals in an interior portion of the terrestrial network coverage area and peripheral base stations providing communications service for radioterminals at a peripheral portion of the terrestrial network coverage area, wherein at least one of the peripheral base stations is a receive-only base station that does not transmit; and
   a space based network comprising at least one satellite, the space based network providing communications service for radioterminals in a first satellite coverage area using a first frequency of a satellite frequency band and providing communications service for radioterminals in a second satellite coverage area using a second frequency of the satellite frequency band, wherein at least a portion of the terrestrial network coverage area is within the first satellite coverage area, wherein an entirety of the terrestrial network coverage area is outside the second satellite coverage area, and wherein at least one of the base stations provides communications service using the second frequency of the satellite frequency band, and refrains from providing communications service using the first frequency of the satellite frequency band.

14. A wireless communications system according to claim 13 wherein the space based network transmits communications to radioterminals in the first satellite coverage area using the first frequency, wherein the space based network transmits communications to radioterminals in the second satellite coverage area using the second frequency, and wherein the at least one of the base stations transmits communications using the second frequency.

15. A wireless communications system according to claim 14 wherein the space based network receives communications from radioterminals in the first satellite coverage area using a third frequency, wherein the space based network receives communications from radioterminals in the second satellite coverage area using a fourth frequency, and wherein the at least one of the base stations receives communications using the fourth frequency, and refrains from using the third frequency to receive communications.

16. A wireless communications system according to claim 13 wherein at least one of the interior base stations is a transmit and receive base station.

17. A wireless communications system comprising:
a terrestrial network including a plurality of base stations providing communications service for radioterminals over a terrestrial network coverage area, the plurality of base stations including interior base stations providing communications service for radioterminals in an interior portion of the terrestrial network coverage area and peripheral base stations providing communications service for radioterminals at a peripheral portion of the terrestrial network coverage area, wherein at least one of the peripheral base stations is substantially disabled for transmission away from interior portions of the terrestrial network coverage area; and
a space based network comprising at least one satellite, the space based network providing communications service for radioterminals in a first satellite coverage area using a first frequency of a satellite frequency band and providing communications service for radioterminals in a second satellite coverage area using a second frequency of the satellite frequency band, wherein at least a portion of the terrestrial network coverage area is within the first satellite coverage area, wherein an entirety of the terrestrial network coverage area is outside the second satellite coverage area and wherein at least one of the base stations provides communications service using the second frequency of the satellite frequency band, and refrains from providing communications service using the first frequency of the satellite frequency band.

18. A wireless communications system according to claim 17 wherein at least one of the interior base stations is enabled for transmission in a 360 degree pattern surrounding the at least one of the interior base stations.

* * * * *

UNITED STATES PATENT AND TRADEMARK OFFICE
CERTIFICATE OF CORRECTION

PATENT NO. : 7,558,568 B2  
APPLICATION NO. : 10/880023  
DATED : July 7, 2009  
INVENTOR(S) : Karabinis It is certified that error appears in the above-identified patent and that said Letters Patent is hereby corrected as shown below:

On Title Page:

Item (56), References Cited: Please add U.S. Patent No. -- 5,481,546 A * 1/1996 Dinkins --

Signed and Sealed this

Eighth Day of December, 2009

David J. Kappos  
*Director of the United States Patent and Trademark Office*